(12) United States Patent
Yuan et al.

(10) Patent No.: US 11,116,178 B2
(45) Date of Patent: Sep. 14, 2021

(54) SMART PET TOY CAPABLE OF AUTOMATICALLY ROLLING TO LEAK FOOD

(71) Applicant: TONGFU MANUFACTURING CO., LTD., Nanjing (CN)

(72) Inventors: Huixin Yuan, Nanjing (CN); Wen Zhang, Nanjing (CN); Shentong Li, Nanjing (CN)

(73) Assignee: TONGFU MANUFACTURING CO., LTD., Nanjing (CN)

( * ) Notice: Subject to any disclaimer, the term of this patent is extended or adjusted under 35 U.S.C. 154(b) by 277 days.

(21) Appl. No.: 16/229,880

(22) Filed: Dec. 21, 2018

(65) Prior Publication Data

US 2019/0216049 A1 Jul. 18, 2019

(30) Foreign Application Priority Data

Dec. 25, 2017 (CN) .......................... 201721832023.4

(51) Int. Cl.
*A01K 5/02* (2006.01)
*A01K 15/02* (2006.01)

(52) U.S. Cl.
CPC .............. *A01K 5/02* (2013.01); *A01K 15/021* (2013.01); *A01K 15/025* (2013.01)

(58) Field of Classification Search
CPC ...... A01K 5/02; A01K 15/026; A01K 15/025; A01K 15/021; A01K 5/0291; A01K 29/00; A01K 5/0114; A01K 5/0275; A01K 5/0233; A63H 33/005
See application file for complete search history.

(56) References Cited

U.S. PATENT DOCUMENTS

| 6,073,581 | A | * | 6/2000 | Wang | A01K 5/0114 |
| | | | | | 119/51.01 |
| 9,288,969 | B2 | * | 3/2016 | Christianson | A01K 5/0291 |
| 9,462,787 | B2 | * | 10/2016 | Christianson | A01K 5/0275 |
| 2002/0115377 | A1 | * | 8/2002 | Herrenbruck | A01K 15/025 |
| | | | | | 446/475 |
| 2007/0068464 | A1 | * | 3/2007 | Smith | A01K 15/025 |
| | | | | | 119/709 |
| 2009/0314221 | A1 | * | 12/2009 | Wang | A01K 15/025 |
| | | | | | 119/707 |
| 2015/0128875 | A1 | * | 5/2015 | Christianson | A01K 5/0114 |
| | | | | | 119/707 |
| 2015/0342145 | A1 | * | 12/2015 | Christianson | A01K 29/00 |
| | | | | | 119/51.11 |
| 2016/0219835 | A1 | * | 8/2016 | Faecher | A01K 27/009 |
| 2016/0278342 | A1 | * | 9/2016 | Wolfe, Jr. | A01K 5/0114 |
| 2018/0160648 | A1 | * | 6/2018 | Goh | H04L 67/125 |

\* cited by examiner

*Primary Examiner* — Trinh T Nguyen
(74) *Attorney, Agent, or Firm* — Oliff PLC

(57) ABSTRACT

A smart pet toy capable of automatically rolling to leak food, including a chamber, where the chamber is in a ball shape or a cylindrical shape and is internally provided with a mechanism; the mechanism is internally provided with a driving apparatus, and the driving apparatus is connected to the chamber by using a drive rod, so that the mechanism can drive the chamber to roll; the chamber is internally provided with an annular storage area, and the wall of the chamber is provided with food leakage windows in communication with the storage area, so that pet food in the storage area leaks out through the food leakage windows. The toy can be flexibly controlled manually or by a remote controller to roll and leak food as required.

7 Claims, 5 Drawing Sheets

SMART PET TOY CAPABLE OF AUTOMATICALLY ROLLING TO LEAK FOOD

BACKGROUND

Technical Field

The utility model relates to a pet toy, in particular, to a smart pet toy capable of automatically rolling and leaking food, and specifically, to an improved smart pet toy capable of automatically rolling to leak food.

Related Art

Currently, most toys that can carry pet food are made of solid and chewing-resistant materials such as high-density rubber, and the food in these toys can attract pets. Food can be inserted into a pet toy, and the pet is attracted by the smell of the food and then plays with the toy. Once the food is eaten up, the pet loses interest in the toy. Alternatively, food is poured into a toy with food leakage holes. The food leaks out when the toy is pushed with a pet's paw or nose. However, still balls hardly attract the pet, and if the food cannot leak out due to misoperations of the pet, the pet loses interest in the toys.

SUMMARY

The objective of the utility model is to provide a smart pet toy capable of automatically rolling to leak food to make up for drawbacks in the prior art. The toy can be controlled manually or by a remote controller to roll and leak food as required, which effectively increases the attraction of the toy, controls the feeding speed, and increases interaction and enjoyment of a game, thereby fully meeting the market requirements.

Technical solutions of the utility model are as follows:

A smart pet toy capable of automatically rolling to leak food includes a chamber, where the chamber is in a ball shape or a cylindrical shape and is internally provided with a mechanism; the mechanism is internally provided with a driving apparatus, and the driving apparatus is connected to the chamber by using a drive rod, so that the mechanism can drive the chamber to roll; the chamber is internally provided with an annular storage area, and the wall of the chamber is provided with food leakage windows in communication with the storage area, so that as the chamber rolls, pet food inside will leak out through the food leakage windows; and an adjustment apparatus capable of changing a size of the food leakage window is disposed at the food leakage window.

Preferably, two ends of the chamber are respectively provided with a left end cover and a right end cover that can be opened; the left end cover and the right end cover are each in a disc shape, and edges of the left end cover and the right end cover are each provided with a buckle; inner edges of end openings at the two ends of the chamber are each provided with a buckle seat engaged with the buckle, so that the left end cover and the right end cover can be movably clamped to the chamber.

Preferably, the chamber is further internally provided with a rotation cover fixed between the mechanism and the left end cover; and an edge of the rotation cover is provided with a buckle capable of engaging with a buckle seat disposed inside the chamber, so that the rotation cover is movably connected to the chamber.

Preferably, one end of the mechanism is provided with a button guide rod that protrudes outward, and the rotation cover is provided with a first column tube that protrudes towards a direction of the left end cover, so that the button guide rod can be movably inserted into the first column tube.

Preferably, the driving apparatus includes a motor and a gear box that are connected to each other, and the gear box is connected to the drive rod; the motor is connected to a trigger apparatus and a battery, to control the motor to actuate; the bottom of the mechanism is provided with a detachable battery cover, and the battery is mounted between the driving apparatus and the battery cover; a bobweight block is disposed beside the driving apparatus; and an ON/OFF button is disposed on the left end cover.

Preferably, the trigger apparatus includes a rolling ball sensor switch and a wireless remote control module, and the rolling ball sensor switch and the wireless remote control module are connected to a single-chip microcomputer, so that operations of the rolling ball sensor switch and the wireless remote control module are controlled by the single-chip microcomputer.

Preferably, an inner side of the right end cover is provided with a second column tube, so that the drive rod can be movably inserted into the second column tube and drive the right end cover to rotate.

Preferably, the adjustment apparatus includes a frame body. An upper edge and a lower edge of the frame body are separately provided with a slide rail, and a movable baffle plate is set to slide along the slide rail, which ensures that the size of the food leakage window can be adjusted by moving the baffle plate.

Preferably, a rack-shaped positioning slot is disposed into the slide rail, and a corresponding toothed positioning block is disposed on a corresponding edge of the movable baffle plate, to prevent the movable baffle plate from sliding randomly.

Preferably, the exterior of the chamber is further sheathed with a protection sleeve, to reduce noise and facilitate cleaning; the protection sleeve is made of flexible rubber material (or TPE, TPR, TPU, EVA, POE, silica gel, PVC, PU), to facilitate deformation; the protection sleeve is provided with a sleeve opening through which the chamber is sheathed or detached after the sleeve opening deforms; the protection sleeve is further provided with a notch matching the food leakage window; and the surface of the protection sleeve is provided with protrusions, to increase friction and facilitate better rolling.

Beneficial effects of the utility model are as follows:

The utility model is reasonable in design and convenient in operation. The toy can be flexibly controlled manually or by a remote controller to roll and leak food as required, which effectively increases the attraction of the toy, controls the feeding speed, and increases interaction and enjoyment of a game, thereby fully meeting the market requirements. In addition, the protection sleeve can reduce collision noises and facilitate cleaning.

1: ON/OFF button; 2: Left end cover; 3: Hand hooking seat; 4: First column tube; 5: Rotation cover; 6: Mechanism; 7: Chamber; 8: Right end cover; 9: Second column tube; 10: Food leakage window; 11: Drive rod; 12: Button guide rod; 13: Bobweight block; 14: Gear box; 15: Battery; 16: Battery cover; 17: Wireless remote control module; 18: Rolling ball sensor switch; 19: Motor; 20: Storage area; 21: Adjustment apparatus; 211: Frame body; 212: Positioning slot; 213: Positioning block; 214: Movable baffle plate; 22: Notch; Protrusion; 24: Sleeve opening.

DETAILED DESCRIPTION

This utility model is further described below with reference to the accompanying drawings and embodiments.

Figure 1:
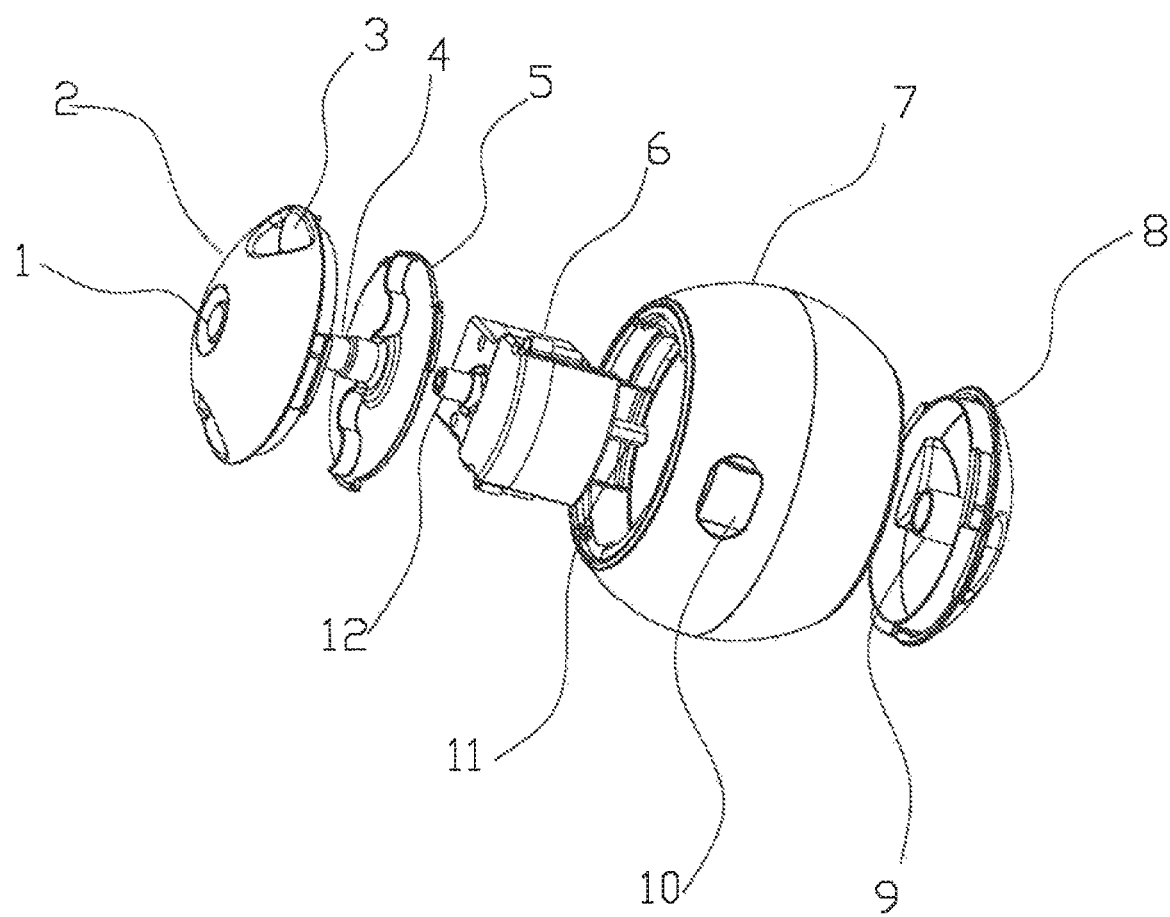
FIG. 1 is a schematic exploded view of the utility model.
Figure 2:
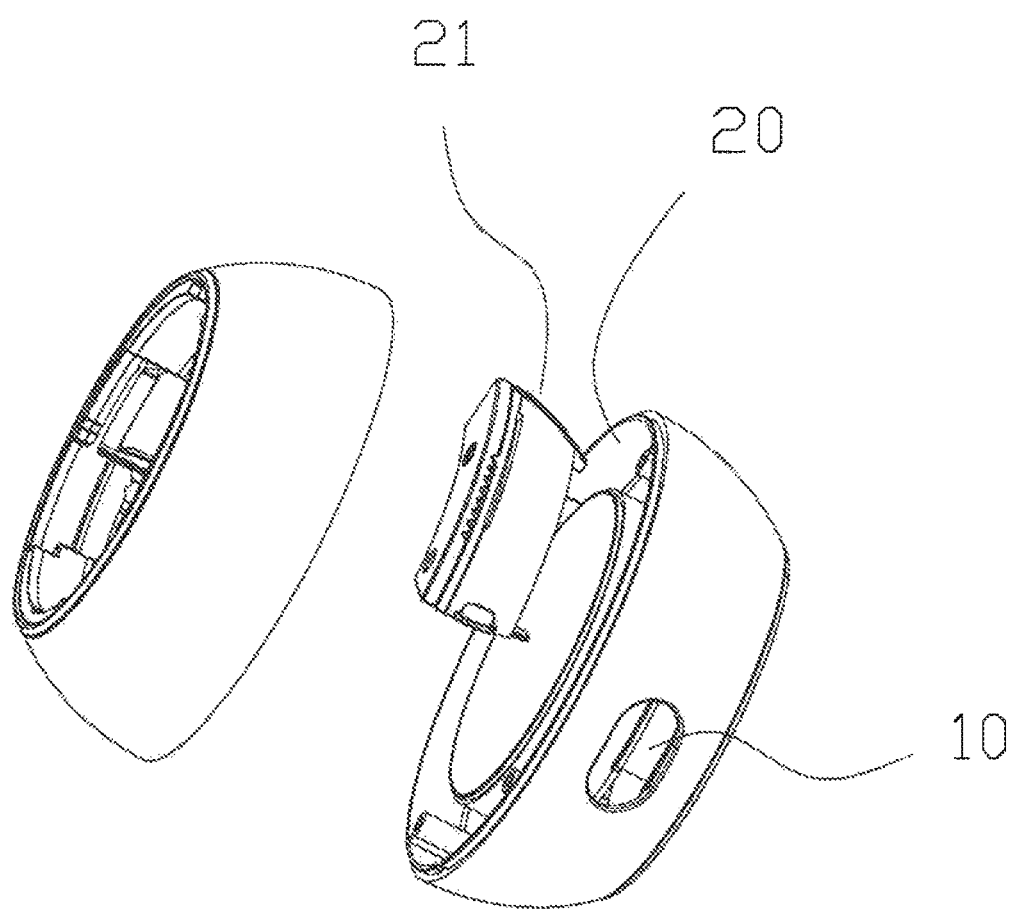
FIG. 2 is a schematic exploded view of a middle portion of a chamber of the utility model.
Figure 3:
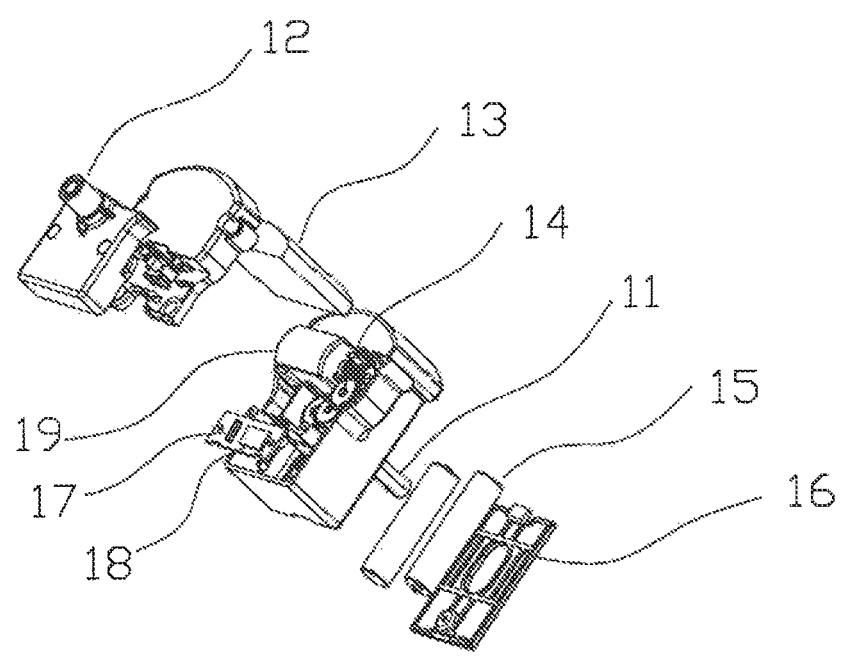
FIG. 3 is a schematic exploded view of a mechanism of the utility model.
Figure 4:
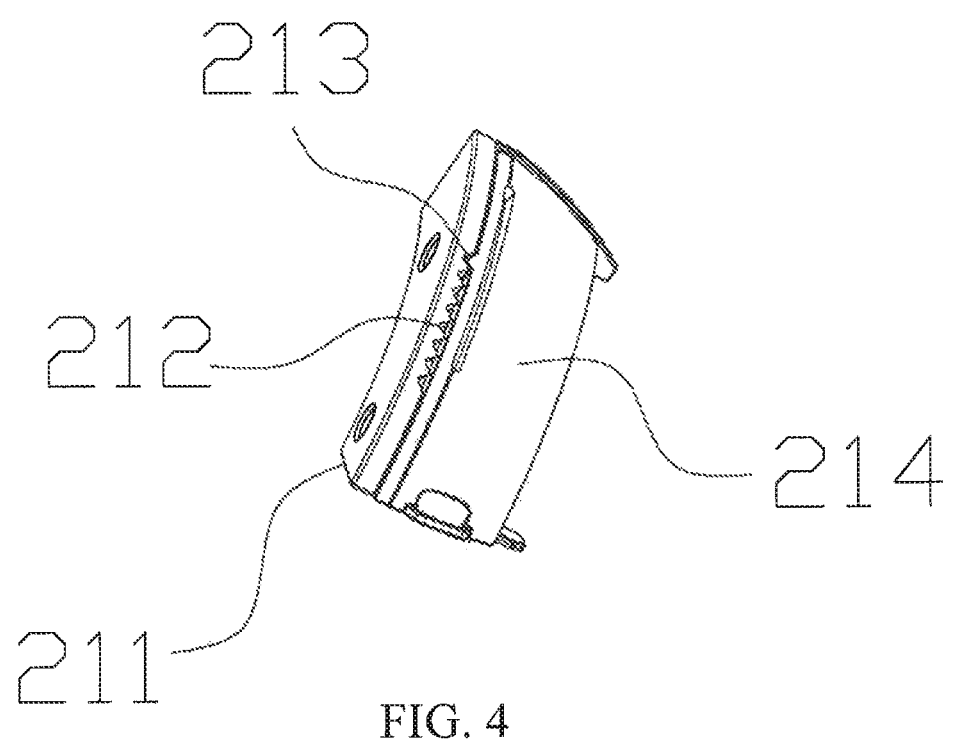
FIG. 4 is a schematic view of an adjustment apparatus of the utility model.
Figure 5:
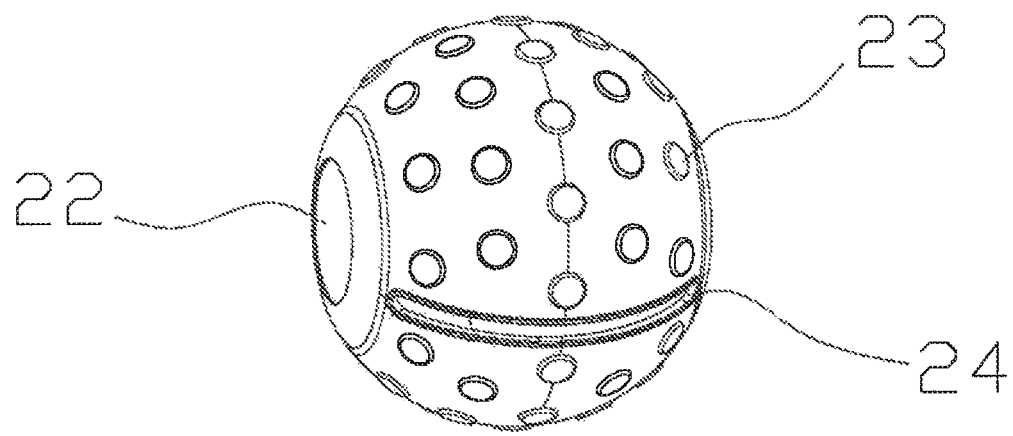
FIG. 5 is a schematic view of a protection sleeve of the utility model.

As shown in FIG. 1 to FIG. 5, a smart pet toy capable of automatically rolling to leak food includes a chamber 7. The chamber 7 is in a ball shape or a cylindrical shape, to facilitate rolling. The chamber 7 is internally provided with a mechanism 6; the mechanism 6 is internally provided with a driving apparatus, and the driving apparatus is connected to the chamber 7 by using a drive rod 11, so that the mechanism 6 can drive the chamber 7 to roll; the chamber 7 is internally provided with an annular storage area, and the wall of the chamber 7 is provided with two food leakage windows 10 in communication with the storage area 20, so that as the chamber 7 rolls, pet food inside will leak out through the food leakage windows 10, to attract a pet.

Two ends of the chamber 7 are respectively provided with a left end cover 2 and a right end cover 8 that can be opened. The left end cover 2 and the right end cover 8 are each in a disc shape, and edges of the left end cover 2 and the right end cover 8 are each provided with a buckle; inner edges of end openings at the two ends of the chamber 7 are each provided with a buckle seat engaged with the buckle, so that the left end cover 2 and the right end cover 8 can be movably clamped to the chamber 7, to facilitate opening.

The chamber 7 is further internally provided with a rotation cover 5 fixed between the mechanism 6 and the left end cover 2; and an edge of the rotation cover 5 is provided with a buckle capable of engaging with a buckle seat disposed inside the chamber 7, so that the rotation cover 5 is movably connected to the chamber 7, to facilitate an operation such as taking out or placing the mechanism 6 after the rotation cover 5 is opened.

One end of the mechanism 6 is provided with a button guide rod 12 that protrudes outward, and the rotation cover 5 is provided with a first column tube 4 that protrudes towards a direction of the left end cover 2, so that the button guide rod 12 can be movably inserted into the first column tube 4, and serves as a bearing end of the mechanism 6.

The driving apparatus includes a motor 19 and a gear box 14 that are connected to each other, and the gear box 14 is connected to the drive rod 11 to convey power. An inner side of the right end cover 8 is provided with a second column tube 9, so that the drive rod 11 can be movably inserted into the second column tube 9. Preferably, the drive rod 11 is in a prism shape and is sheathed with the second column tube 9, to drive the right end cover 8 to rotate simultaneously, so as to drive the chamber 7 to roll. The motor 19 is connected to a trigger apparatus and a battery, to control the motor to actuate; and the trigger apparatus includes a rolling ball sensor switch 18 and a wireless remote control module 17, and the rolling ball sensor switch 18 and the wireless remote control module 17 are connected to a single-chip microcomputer, so that operations of the rolling ball sensor switch 18 and the wireless remote control module 17 are controlled by the single-chip microcomputer.

The bottom of the mechanism 6 is provided with a battery cover 16 connected to the mechanism 6 by using a screw, and the battery 15 is mounted between the driving apparatus and the battery cover 16, to facilitate replacement of the battery. A bobweight block 13 is disposed beside the driving apparatus, to increase kinetic energy, increase a rolling speed, reduce electric power consumption, and prolong use time of the battery.

The left end cover 2 is provided with an ON/OFF button 1, to facilitate control over power. The left and right end covers are separately provided with a recessed hand hooking seat 3, to facilitate mounting and detaching of the end covers.

An inner side of the food leakage windows 10 is provided with an adjustment apparatus 21. The adjustment apparatus 21 includes a frame body 211. An upper edge and a lower edge of the frame body 211 are separately provided with a slide rail, and a movable baffle plate 214 is set to slide along the slide rail, which ensures that the size of the food leakage window 10 can be adjusted by moving the baffle plate 214. A rack-shaped positioning slot 212 is disposed into the slide rail, and a corresponding toothed positioning block 213 is disposed on a corresponding edge of the movable baffle plate 214, to prevent the movable baffle plate 214 from sliding randomly, to change the size of the food leakage window 10 and satisfy leaking requirements of different pet food.

The exterior of the chamber 7 is further sheathed with a protection sleeve, to reduce noise and facilitate cleaning, and to protect the chamber 7 against abrasion and chewing. The protection sleeve is made of flexible rubber material (or TPE, TPR, TPU, EVA, POE, silica gel, PVC, PU), to facilitate deformation; the protection sleeve is provided with a sleeve opening 24 through which the chamber 7 is sheathed or detached after the sleeve opening 24 deforms; the protection sleeve is further provided with a notch 22 matching the food leakage window 10, to facilitate leaking out of pet food; and the surface of the protection sleeve is provided with protrusions 23, to increase friction and facilitate better rolling.

The wireless remote control module may be a Bluetooth module, and an optional model is JDY-08. The wireless remote control module can implement remote control by connecting to a corresponding APP.

The wireless remote control module may alternatively be an RF module, and an optional model is NRF24L01. The RF module connects to the driving apparatus, and connects a control chip of the driving apparatus to another device in a wireless manner, to control, by using an APP on the another device, the driving apparatus to actuate.

The wireless remote control module may alternatively be a WIFI module, and an optional model is ESP8266. The WIFI module connects to the driving apparatus, to control, by using a corresponding APP, the driving apparatus to actuate.

The wireless remote control module may alternatively be a GPRS module, and an optional model is Quectel M20. The GPRS module connects to the driving apparatus, to control, by using a corresponding APP, the driving apparatus to actuate.

A use method of the utility model is as follows:

Standalone mode: The ON/OFF button is turned on, and after the single-chip microcomputer is powered on, the motor operates and drives the chamber to roll, thereby attracting a pet. After a period of time, the motor stops operating, and the chamber rolls inertially due to the bob-weight block. The rolling ball sensor switch can be triggered with a pet's paw or nose. After the single-chip microcomputer receives a signal from the rolling ball sensor switch, the motor operates again. While the chamber rolls, pet food in the storage area may leak out from the food leakage windows along the rolling of the chamber, thereby further catching the pet's attraction. After all the food leaks out, the corresponding end covers may be opened, and food is added into the storage area. After the end covers are closed, the toy can be used again. The exterior of the chamber is sheathed with the protection sleeve, to reduce noise and facilitate cleaning.

Remote control mode: The wireless remote control module is connected to a corresponding APP, and the single-chip microcomputer is switched to a network mode, that is, a signal of the rolling ball sensor switch is shielded. The APP directly controls the single-chip microcomputer to operate the motor, so as to enable the chamber to roll, thereby increasing enjoyment and interaction of the game.

Parts not included in the utility model are similar to the prior art or may be achieved by using the prior art.

What is claimed is:

1. A smart pet toy capable of automatically rolling to leak food, comprising a chamber, wherein the chamber is in a ball shape or a cylindrical shape and is internally provided with a mechanism; the mechanism is internally provided with a driving apparatus, and the driving apparatus is connected to the chamber by using a drive rod, so that the mechanism can drive the chamber to roll; the chamber is internally provided with an annular storage area, and the wall of the chamber is provided with food leakage windows in communication with the storage area, so that as the chamber rolls, pet food inside will leak out through the food leakage windows; and an adjustment apparatus capable of changing a size of the food leakage window is disposed at the food leakage window, wherein two ends of the chamber are respectively provided with a left end cover and a right end cover that can be opened, the left end cover and the right end cover are each in a disc shape, and edges of the left end cover and the right end cover are each provided with a first buckle, inner edges of end openings at the two ends of the chamber are each provided with a first buckle seat engaged with the first buckle, so that the left end cover and the right end cover can be movably clamped to the chamber, the chamber is further internally provided with a rotation cover fixed between the mechanism and the left end cover, and an edge of the rotation cover is provided with a second buckle capable of engaging with a second buckle seat disposed inside the chamber, so that the rotation cover is movably connected to the chamber, and one end of the mechanism is provided with a button guide rod that protrudes outward, and the rotation cover is provided with a first column tube that protrudes towards a direction of the left end cover, so that the button guide rod can be movably inserted into the first column tube.

2. The smart pet toy capable of automatically rolling to leak food according to claim 1, wherein the driving apparatus comprises a motor and a gear box that are connected to each other, and the gear box is connected to the drive rod; the motor is connected to a trigger apparatus and a battery, to control the motor to actuate; the bottom of the mechanism is provided with a detachable battery cover, and the battery is mounted between the driving apparatus and the battery cover; a bobweight block is disposed beside the driving apparatus; and an ON/OFF button is disposed on the left end cover.

3. The smart pet toy capable of automatically rolling to leak food according to claim 2, wherein the trigger apparatus comprises a rolling ball sensor switch and a wireless remote control module, and the rolling ball sensor switch and the wireless remote control module are connected to a single-chip microcomputer, so that operations of the rolling ball sensor switch and the wireless remote control module are controlled by the single-chip microcomputer.

4. The smart pet toy capable of automatically rolling to leak food according to claim 1, wherein an inner side of the right end cover is provided with a second column tube, so that the drive rod can be movably inserted into the second column tube and drive the right end cover to rotate.

5. The smart pet toy capable of automatically rolling to leak food according to claim 1, wherein the adjustment apparatus comprises a frame body, an upper edge and a lower edge of the frame body are separately provided with a slide rail, a movable baffle plate is set to slide along the slide rail, which ensures that the size of the food leakage window can be adjusted by moving the movable baffle plate.

6. The smart pet toy capable of automatically rolling to leak food according to claim 5, wherein a rack-shaped positioning slot is disposed into the slide rail, and a corresponding toothed positioning block is disposed on a corresponding edge of the movable baffle plate, to prevent the movable baffle plate from sliding randomly.

7. The smart pet toy capable of automatically rolling to leak food according to claim 1, wherein the exterior of the chamber is further sheathed with a protection sleeve, to reduce noise and facilitate cleaning; the protection sleeve is made of flexible rubber material (or TPE, TPR, TPU, EVA, POE, silica gel, PVC, PU), to facilitate deformation; the protection sleeve is provided with a sleeve opening through which the chamber is sheathed or detached after the sleeve opening deforms; the protection sleeve is further provided with a notch matching the food leakage window; and the surface of the protection sleeve is provided with protrusions, to increase friction and facilitate better rolling.

* * * * *